US012112719B2

(12) United States Patent
Lin et al.

(10) Patent No.: US 12,112,719 B2
(45) Date of Patent: Oct. 8, 2024

(54) ELECTRONIC DEVICE AND MODULATING DEVICE WITH SHORT FRAME TIME LENGTH

(71) Applicant: Innolux Corporation, Miaoli County (TW)

(72) Inventors: Yi-Hung Lin, Miaoli County (TW); Cheng-Hung Tsai, Miao-Li County (TW)

(73) Assignee: Innolux Corporation, Miaoli County (TW)

(*) Notice: Subject to any disclaimer, the term of this patent is extended or adjusted under 35 U.S.C. 154(b) by 0 days.

(21) Appl. No.: 18/167,902

(22) Filed: Feb. 13, 2023

(65) Prior Publication Data

US 2023/0282179 A1 Sep. 7, 2023

Related U.S. Application Data

(60) Provisional application No. 63/316,420, filed on Mar. 4, 2022.

(30) Foreign Application Priority Data

Nov. 30, 2022 (CN) ........................ 202211520931.5

(51) Int. Cl.
*G09G 5/00* (2006.01)

(52) U.S. Cl.
CPC ..... *G09G 5/006* (2013.01); *G09G 2300/0408* (2013.01); *G09G 2310/0202* (2013.01); (Continued)

(58) Field of Classification Search
CPC .. G09G 3/3266; G09G 3/3677; G09G 3/3283; G09G 3/3688; G09G 3/3685; (Continued)

(56) References Cited

U.S. PATENT DOCUMENTS 10,446,719 B2 10/2019 Bower et al.
2005/0110732 A1* 5/2005 Kim .................... G09G 3/3648 345/87

(Continued)

FOREIGN PATENT DOCUMENTS

CN 101359143 2/2009
CN 105469761 12/2017

(Continued)

OTHER PUBLICATIONS

"Partial Search Report of Europe Counterpart Application", issued on Apr. 18, 2023, p. 1-p. 19.

*Primary Examiner* — Xuemei Zheng
(74) *Attorney, Agent, or Firm* — JCIPRNET

(57) ABSTRACT

An electronic device with short frame time length is provided. The electronic device includes a substrate, a plurality of first signal lines, a plurality of second signal lines, and two first integrated circuits. The plurality of first signal lines are disposed on the substrate. The plurality of first signal lines are divided into a first group of signal lines and a second group of signal lines. The plurality of second signal lines are disposed on the substrate. The plurality of second signal lines are disposed alternately with the plurality of first signal lines. The two first integrated circuits are bonded on the substrate. Each of the two first integrated circuits are electrically connected to the first group of signal lines and the second group of signal lines. The first group of signal lines and the second group of signal lines are disposed alternately in columns.

20 Claims, 11 Drawing Sheets

(52) U.S. Cl.
CPC ............... *G09G 2310/0243* (2013.01); *G09G 2310/0264* (2013.01)

(58) Field of Classification Search
CPC ...... G09G 3/3275; G09G 3/3648; G09G 3/20; G09G 5/006; G09G 2310/0202; G09G 2310/0243; G09G 2310/0264; G09G 2300/0408; G09G 2300/0426; G09G 2310/0205; G09G 2310/021; G09G 2310/0281; G09G 2310/027; G09G 3/3674
See application file for complete search history.

(56) References Cited

U.S. PATENT DOCUMENTS

| | | | | |
|---|---|---|---|---|
| 2008/0129652 | A1 | 6/2008 | Park | |
| 2016/0063961 | A1* | 3/2016 | Pyo | G09G 3/2022 345/82 |
| 2016/0089979 | A1* | 3/2016 | Bianchi | B60K 37/02 701/49 |
| 2016/0284305 | A1* | 9/2016 | Xu | G09G 3/3688 |
| 2019/0005905 | A1* | 1/2019 | Chen | G09G 3/3618 |
| 2019/0392776 | A1* | 12/2019 | Park | G09G 3/3696 |
| 2021/0256926 | A1* | 8/2021 | Yun | G09G 3/3677 |
| 2021/0295755 | A1* | 9/2021 | Lin | G09G 3/20 |
| 2023/0326934 | A1* | 10/2023 | Yoshimoto | G09G 3/20 345/204 |

FOREIGN PATENT DOCUMENTS

| | | |
|---|---|---|
| EP | 3131086 | 1/2019 |
| TW | I420493 | 12/2013 |

* cited by examiner

ELECTRONIC DEVICE AND MODULATING DEVICE WITH SHORT FRAME TIME LENGTH

CROSS-REFERENCE TO RELATED APPLICATION

This application claims the priority benefit of U.S. provisional application Ser. No. 63/316,420, filed on Mar. 4, 2022 and China application serial no. 202211520931.5, filed on Nov. 30, 2022. The entirety of each of the above-mentioned patent applications is hereby incorporated by reference herein and made a part of this specification.

BACKGROUND

Technical Field

The disclosure relates to an electronic device, and more particularly to an electronic device and a modulating device with short frame time length.

Description of Related Art

The driving method of existing electronic devices (such as displays or antenna arrays) is sequential driving, that is, row-by-row and column-by-column driving. The frame time length of an electronic device (such as a display or an antenna array) is determined by the number of data lines and the number of scan lines. However, the frame time length is limited by the charging time of data lines and scan lines. That is to say, the greater the number of data lines and the number of scan lines, the greater the time length of the frame time. Therefore, the time for updating the data of the electronic device is longer. It may be seen that how to provide a driving method for an electronic device with short frame time length is one of the research focuses of those skilled in the art.

SUMMARY

The disclosure is directed to an electronic device and a modulating device with short frame time length.

According to an embodiment of the disclosure, an electronic device includes a substrate, a plurality of first signal lines, a plurality of second signal lines, and two first integrated circuits. The plurality of first signal lines are disposed on the substrate. The plurality of first signal lines are divided into a first group of signal lines and a second group of signal lines. The plurality of second signal lines are disposed on the substrate. The plurality of second signal lines are disposed alternately with the plurality of first signal lines. The two first integrated circuits are bonded on the substrate. Each of the two first integrated circuits are electrically connected to the first group of signal lines and the second group of signal lines. The first group of signal lines and the second group of signal lines are disposed alternately in columns.

According to an embodiment of the disclosure, a modulating device includes a substrate, a modulating element, a plurality of first signal lines, a plurality of second signal lines, and two first integrated circuits. The plurality of first signal lines are disposed on the substrate. The plurality of first signal lines are divided into a first group of signal lines and a second group of signal lines. One of the plurality of first signal lines is electrically connected to the modulating element. The plurality of second signal lines are disposed on the substrate. The plurality of second signal lines are disposed alternately with the plurality of first signal lines. One of the plurality of second signal lines is electrically connected to the modulating element. The two first integrated circuits are bonded on the substrate. Each of the two first integrated circuits are electrically connected to the first group of signal lines and the second group of signal lines. The first group of signal lines and the second group of signal lines are disposed alternately in columns.

Based on the above, each of the two first integrated circuits are electrically connected to the first group of signal lines and the second group of signal lines. Moreover, the first group of signal lines and the second group of signal lines are disposed alternately in columns. That is to say, the signals received by two adjacent signal lines come from different first integrated circuits. Therefore, the first signal lines do not need to wait for the adjacent preceding signal line to be charged before being charged. In this way, the frame time length of the electronic device may be shortened.

DESCRIPTION OF THE EMBODIMENTS

Figure 1:
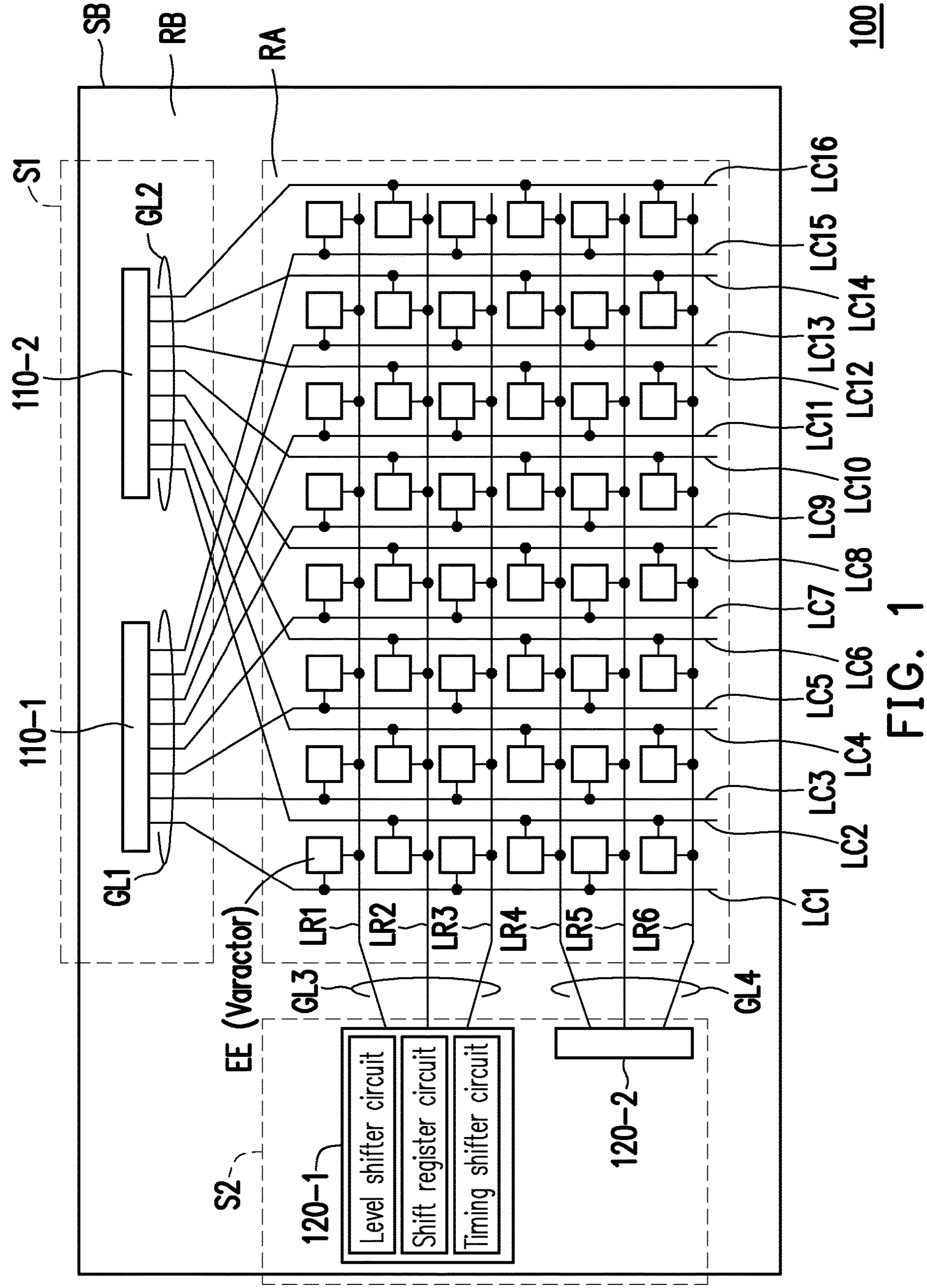
FIG. 1 is a schematic diagram of an electronic device shown according to the first embodiment of the disclosure.

The disclosure may be understood by referring to the following detailed description taken in conjunction with the accompanying drawings as described below. It should be noted that, for purposes of clarity and easy understanding by readers, each drawing of the disclosure depicts a portion of an electronic device, and some elements in each drawing may not be drawn to scale. In addition, the number and size of each device depicted in the drawings are illustrative and not intended to limit the scope of the disclosure.

Certain terms are used throughout the description and the following claims to refer to specific elements. As will be understood by those skilled in the art, manufacturers of electronic equipment may refer to elements by different names. This document does not intend to distinguish between elements that differ in name but not function. In the following description and in the claims, the terms “containing”, “including”, and “having” are used in an open-ended manner, and should therefore be construed to mean “containing but not limited to . . . ” Accordingly, when the terms "containing", "including", and/or "having" are used in the description of the disclosure, it will be indicated that there are corresponding features, regions, steps, operations, and/or elements, but not limited to there being one or a plurality of corresponding features, regions, steps, operations, and/or elements.

The electrical connection or coupling described in the disclosure may refer to direct connection or indirect connection. In the case of direct connection, the endpoints of the members on two circuits are directly connected or connected to each other by a conductive line segment. In the case of indirect connection, there are switches, diodes, capacitors, inductors, resistors, other suitable members, or a combination of the members between the endpoints of the members on the two circuits, but the disclosure is not limited thereto.

Although terms such as first, second, third, etc. may be used to describe various constituent elements, such constituent elements are not limited by these terms. The terms are used to distinguish a constituent element from other constituent elements in the specification. The claims may not use the same terms, but may use the terms first, second, third etc. with respect to the required order of the elements. Therefore, in the following description, a first constituent element may be a second constituent element in the claims.

An electronic device of the disclosure may include a display device, a modulating device, a sensing device, or a tiling device, but the disclosure is not limited thereto. The electronic device may include a bendable or flexible electronic device. The electronic device, for example, includes a liquid-crystal layer or a light-emitting diode (LED). The electronic device may include an electronic element. The electronic element may include passive and active elements, such as capacitors, resistors, inductors, variable capacitors, filters, diodes, transistors, sensors, microelectromechanical systems (MEMS), liquid-crystal chips, etc., but the disclosure is not limited thereto. The diode may include an LED or a photodiode. The LED may include, for example, an organic LED (OLED), a mini LED, a micro LED, or a quantum dot LED, fluorescence, phosphor, or other suitable materials, or a combination of the above, but the disclosure is not limited thereto. The sensor may include, for example, a capacitive sensor, an optical sensor, an electromagnetic sensor, a fingerprint sensor (FPS), a touch sensor, or a pen sensor, but the disclosure is not limited thereto. It should be noted that the electronic device may be any arrangement and combination of the above, but the disclosure is not limited thereto. In addition, the shape of the electronic device may be rectangular, circular, polygonal, a shape having curved edges, or other suitable shapes. The electronic device may have a peripheral system such as a driving system, a control system, a light source system, etc. to support a display device, a modulating device, or a tiling device, but the disclosure is not limited thereto.

In the disclosure, the embodiments use "pixel" or "pixel unit" as a unit for describing a specific area including at least one functional circuit for at least one specific function. The area of a "pixel" depends on the unit used to provide a particular function, adjacent pixels may share the same portions or conductive lines, but may also contain specific portions of themselves. For example, adjacent pixels may share the same scan line or the same data line, but a pixel may also have its own transistor or capacitor.

It should be noted that technical features in different embodiments described below may be replaced, reorganized, or mixed with each other to form another embodiment without departing from the spirit of the disclosure.

Please refer to FIG. 1. FIG. 1 is a schematic diagram of an electronic device shown according to the first embodiment of the disclosure. In the present embodiment, an electronic device 100 includes a substrate SB, first signal lines LC1 to LC16, second signal lines LR1 to LR6, and first integrated circuits (ICs) 110-1 and 110-2. The first signal lines LC1 to LC16 are respectively disposed on the substrate SB. The second signal lines LR1 to LR6 are respectively disposed on the substrate SB. The second signal lines LR1 to LR6 are disposed alternately with the first signal lines LC1 to LC16. Taking the present embodiment as an example, the first signal lines LC1 to LC16 are respectively extended along the column direction and arranged along the row direction. The second signal lines LR1 to LR6 are respectively extended along the row direction and arranged along the column direction. The substrate SB includes an active area RA and a peripheral area RB. The first signal lines LC1 to LC16 and the second signal lines LR1 to LR6 are disposed alternately in the active area RA.

In the present embodiment, the first signal lines LC1 to LC16 are divided into a first group of signal lines GL1 and a second group of signal lines GL2. The first group of signal lines GL1 and the second group of signal lines GL2 are disposed alternately in columns. Taking the present embodiment as an example, the first signal lines LC1, LC3, LC5, LC7, LC9, LC11, LC13, and LC15 are grouped into the first group of signal lines GL1. The first signal lines LC2, LC4, LC6, LC8, LC10, LC12, LC14, and LC16 are grouped into the second group of signal lines GL2. The first signal line LC2 is disposed between the first signal lines LC1 and LC3. The first signal line LC3 is disposed between the first signal lines LC2 and LC4. And so forth.

In the present embodiment, the first ICs 110-1 and 110-2 are bonded on the substrate SB. The first ICs 110-1 and 110-2 are each electrically connected to the first group of signal lines GL1 and the second group of signal lines GL2. Taking the present embodiment as an example, the first IC 110-1 is electrically connected to the first group of signal lines GL1. The first IC 110-2 is electrically connected to the second group of signal lines GL2.

It should be mentioned here that, the first ICs 110-1 and 110-2 are each electrically connected to the first group of signal lines GL1 and the second group of signal lines GL2. Moreover, the first group of signal lines GL1 and the second group of signal lines GL2 are disposed alternately in columns. That is to say, the signals received by two adjacent signal lines come from different first ICs. Therefore, the charging of the first signal lines does not need to wait for the charging of the previous adjacent signal line to be completed. For example, the signal received by the first group of signal lines GL1 is from the first IC 110-1. The signal received by the second group of signal lines GL2 is from the first IC 110-2. The second group of signal lines GL2 does not need to wait for the charging of the adjacent first group of signal lines GL1 to be completed to charge. In this way, the frame time length of the electronic device 100 may be shortened.

In the present embodiment, the electronic device 100 may be, for example, a modulating device. The electronic device 100 further includes a plurality of modulating elements EE. For example, the plurality of modulating elements EE are disposed in a plurality of rows and a plurality of columns. The plurality of modulating elements EE may be varactors, resistors, inductors, or other suitable electronic elements respectively. The modulating elements EE are electrically connected to one of the first signal lines LC1 to LC16 and one of the second signal lines LR1 to LR6.

In the present embodiment, the first signal lines LC1 to LC16 may be one of data lines and scan lines. The second signal lines LR1 to LR6 may be the other one of the data lines and the scan lines. The first ICs 110-1 and 110-2 may be one of gate driving ICs and data driving ICs. For example, the first ICs 110-1 and 110-2 may be data driving ICs, and the first signal lines LC1 to LC16 may be data lines respectively. The second signal lines LR1 to LR6 may be scan lines respectively.

The electronic device 100 further includes second ICs 120-1 and 120-2. The second ICs 120-1 and 120-2 are bonded on the substrate SB. The second signal lines LR1 to LR6 are divided into a third group of signal lines GL3 and a fourth group of signal lines GL4. The second ICs 120-1 and 120-2 are each electrically connected to the third group of signal lines GL3 and the fourth group of signal lines GL4. In the present embodiment, the second signal lines LR1 to LR3 are grouped into the third group of signal lines GL3. The second signal lines LR4 to LR6 are grouped into the fourth group of signal lines GL4. The second IC 120-1 is electrically connected to the third group of signal lines GL3. The second IC 120-2 is electrically connected to the fourth group of signal lines GL4. The second ICs 120-1 and 120-2 may be gate driving ICs respectively. For example, the gate driving ICs may include a level shifter circuit, a shift register circuit, and a timing shifter circuit.

In the present embodiment, sixteen first signal lines LC1 to LC16, six second signal lines LR1 to LR6, and two first ICs 110-1 and 110-2 are used as an example. The number of the first signal lines LC1 to LC16, the number of the second signal lines LR1 to LR6, and the number of the first ICs 110-1 and 110-2 of the disclosure may be a plurality of respectively. However, the disclosure is not limited to the present embodiment.

In the present embodiment, the peripheral area RB surrounds the active area RA. The modulating elements EE are disposed in the active area RA. The first ICs 110-1 and 110-2 and the second ICs 120-1 and 120-2 are disposed at the peripheral area RB. The first ICs 110-1 and 110-2 are disposed along the first side S1 of the substrate SB. The second ICs 120-1 and 120-2 are disposed along the second side S2 of the substrate SB.

Figure 2:
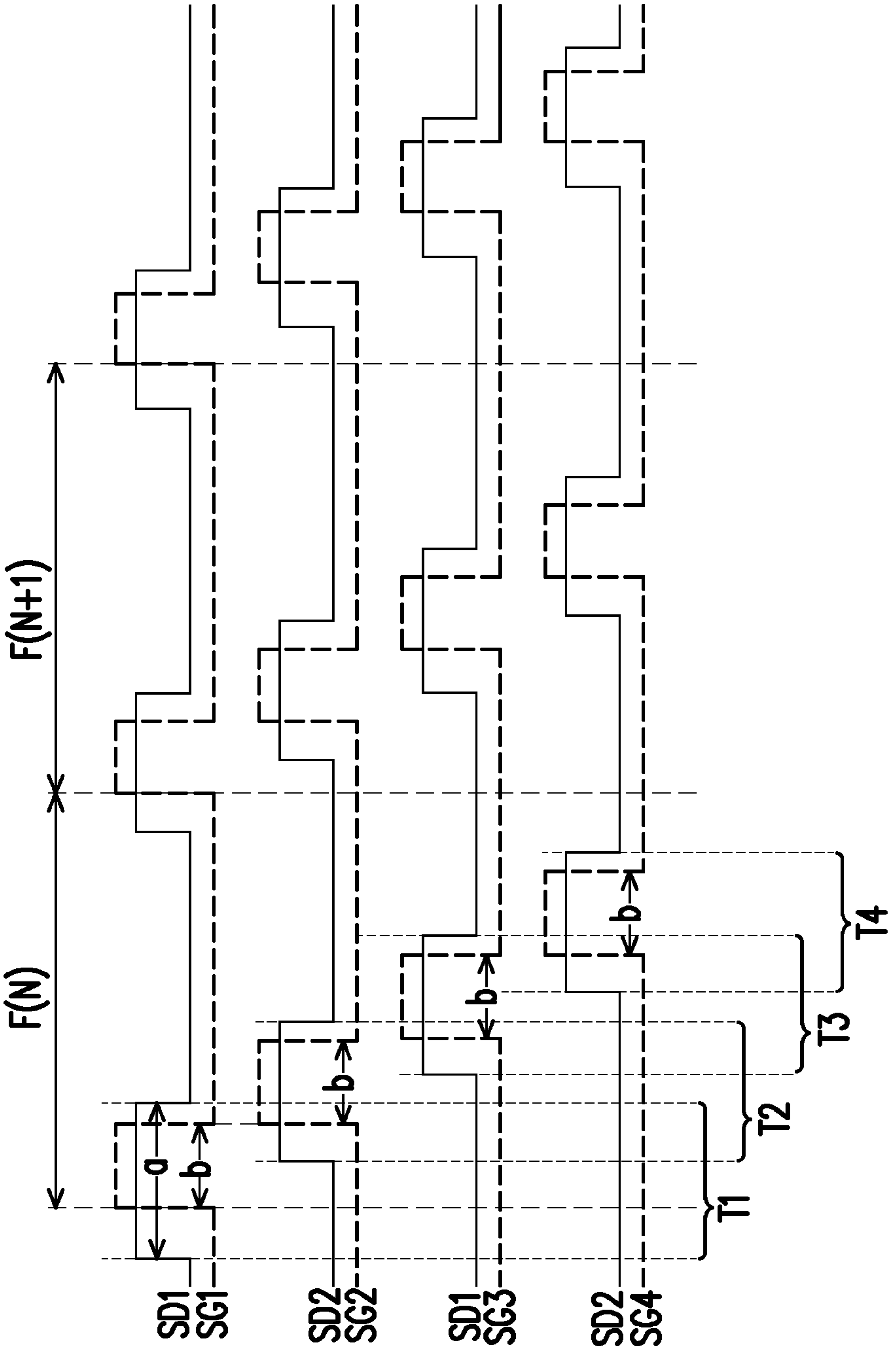
FIG. 2 is a signal timing diagram shown according to the first embodiment of the disclosure.

Please refer to both FIG. 1 and FIG. 2. FIG. 2 is a signal timing diagram shown according to the first embodiment of the disclosure. FIG. 2 illustrates a portion of signal timing. In the present embodiment, the timing diagram shown in FIG. 2 is applicable to the electronic device 100. During a time interval T1, the first IC 110-1 provides a data signal group SD1 to the first group of signal lines GL1. During the time interval T1, the second IC 120-1 provides a scan signal SG1 to the second signal line LR1. A time length b for which the second IC 120-1 provides the scan signal SG1 is shorter than a time length a for which the first IC 110-1 provides the data signal group SD1. During a time interval T2, the first IC 110-2 provides a data signal group SD2 to the second group of signal lines GL2.

During the time interval T2, the second IC 120-1 provides a scan signal SG2 to the second signal line LR2. The time length b for which the second IC 120-2 provides the scan signal SG2 is shorter than a time length a for which the first IC 110-2 provides the data signal group SD2.

During a time interval T3, the first IC 110-1 provides the data signal group SD1 to the first group of signal lines GL1. During the time interval T3, the second IC 120-1 provides a scan signal SG3 to the second signal line LR2. The time length b for which the second IC 120-2 provides the scan signal SG3 is shorter than the time length a.

During a time interval T4, the first IC 110-2 provides the data signal group SD2 to the second group of signal lines GL2. During the time interval T4, the second IC 120-2 provides a scan signal SG4 to the second signal line LR4. The time length b for which the second IC 120-2 provides the scan signal SG4 is shorter than the time length a.

It should be noted that, based on the current driving method, the frame time length is determined by the product of the time length a and a number G of the second signal lines LR1 to LR6, that is, the frame time length is equal to "a×G". However, in the present embodiment, the signal received by the first group of signal lines GL1 in the time interval T1 is from the first IC 110-1. The signal received by the first group of signal lines GL2 in the time interval T2 is from the first IC 110-2. The first group of signal lines GL2 does not need to wait for the charging of the adjacent first group of signal lines GL1 to be completed to charge. This allows the time intervals T1 and T2 to be partially overlapped. Therefore, frame time lengths F(N) and F(N+1) of the present embodiment are respectively determined by the product of the time length b and the number of the second signal lines LR1 to LR6. That is, the frame time lengths F(N) and F(N+1) are equal to "b×G". In this way, the frame time lengths F(N) and F(N+1) of the electronic device 100 may be shortened.

Figure 3:
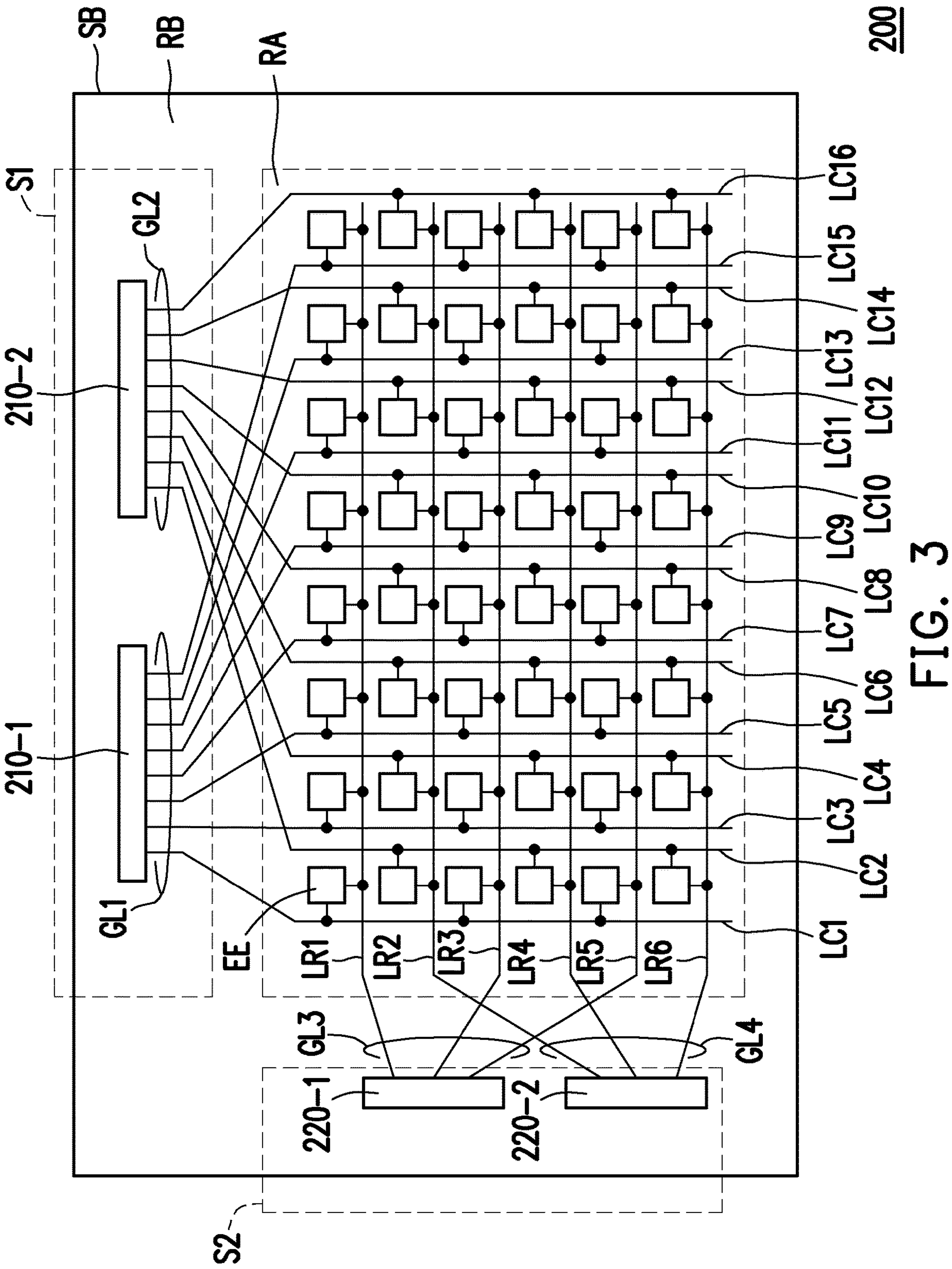
FIG. 3 is a schematic diagram of an electronic device shown according to the second embodiment of the disclosure.

Please refer to FIG. 3. FIG. 3 is a schematic diagram of an electronic device shown according to the second embodiment of the disclosure. In the present embodiment, an electronic device 200 includes the substrate SB, the plurality of modulating elements EE, the first signal lines LC1 to LC16, the second signal lines LR1 to LR6, first ICs 210-1 and 210-2, and second ICs 220-1 and 220-2. One of the first signal lines LC1 to LC16 is electrically connected to the modulating elements EE. One of the second signal lines LR1 to LR6 is electrically connected to the modulating elements EE. The first signal lines LC1, LC3, LC5, LC7, LC9, LC11, LC13, and LC15 are grouped into the first group of signal lines GL1. The first signal lines LC2, LC4, LC6, LC8, LC10, LC12, LC14, and LC16 are grouped into the second group of signal lines GL2. The first group of signal lines GL1 and the second group of signal lines GL2 are disposed alternately in columns. The first IC 210-1 is electrically connected to the first group of signal lines GL1. The first IC 210-2 is electrically connected to the second group of signal lines GL2.

In the present embodiment, the second signal lines LR1 to LR6 are divided into the third group of signal lines GL3 and the fourth group of signal lines GL4. The second signal lines LR1, LR3, and LR5 are grouped into the third group of signal lines GL3. The second signal lines LR2, LR4, and LR6 are grouped into the fourth group of signal lines GL4. In other words, the third group of signal lines GL3 and the fourth group of signal lines GL4 are disposed alternately in rows. The second IC 220-1 is electrically connected to the third group of signal lines GL3. The second IC 220-2 is electrically connected to the fourth group of signal lines GL4.

In the present embodiments, the first ICs 210-1 and 210-2 are disposed along the first side S1 of the substrate SB. The second ICs 220-1 and 220-2 are respectively disposed along at least one side of the substrate SB different from the first side S1. Taking the present embodiment as an example, the second ICs 220-1 and 220-2 are disposed along the second side S2 of the substrate SB.

Figure 4:
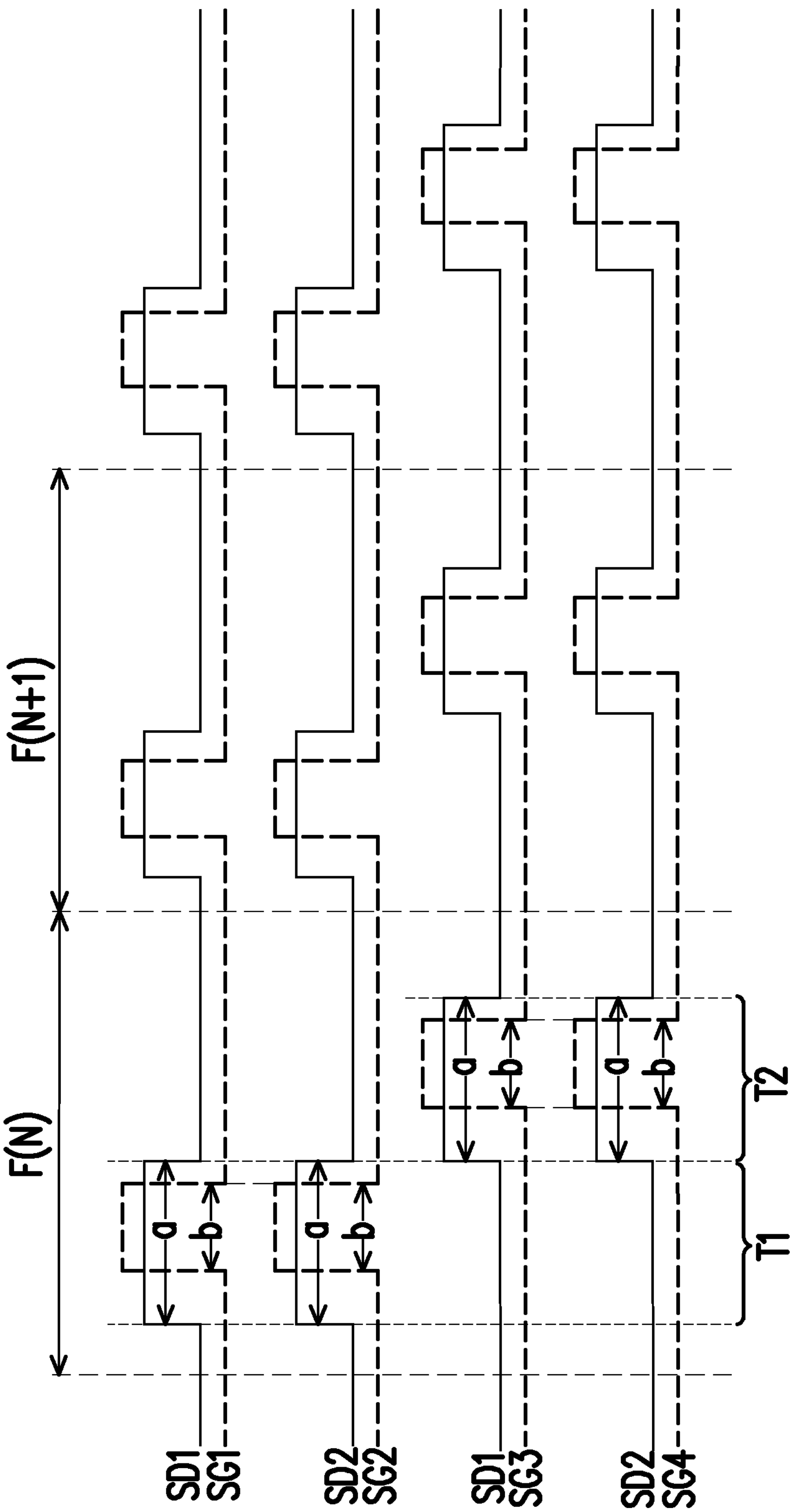
FIG. 4 is a signal timing diagram shown according to the second embodiment of the disclosure.

Please refer to both FIG. 3 and FIG. 4. FIG. 4 is a signal timing diagram shown according to the second embodiment of the disclosure. FIG. 4 illustrates a portion of the signal timing. In the present embodiment, the timing diagram shown in FIG. 4 is applicable to the electronic device 200. During the time interval T1, the first IC 210-1 provides the data signal group SD1 to the first group of signal lines GL1. The first IC 210-2 provides the data signal group SD2 to the second group of signal lines GL2. During the time interval T1, the second IC 220-1 provides the scan signal SG1 to the second signal line LR1. The second IC 220-2 provides the scan signal SG2 to the second signal line LR2. The time length b for which the second ICs 220-1 and 220-2 provide the scan signals SG1 and SG2 is shorter than the time length a for which the first ICs 210-1 and 210-2 provide the data signal groups SD1 and SD2.

During the time interval T2, the first IC 210-1 provides the data signal group SD1 to the first group of signal lines GL1. The first IC 210-2 provides the data signal group SD2 to the second group of signal lines GL2. During the time interval T2, the second IC 220-1 provides the scan signal SG3 to the second signal line LR3. The second IC 220-2 provides the scan signal SG4 to the second signal line LR4. The time length b for which the second ICs 220-1 and 220-2 provide the scan signals SG3 and SG4 is shorter than the time length a.

It should be noted that, in the present embodiment, in each time interval, the signal received by the first group of signal lines GL1 is from the first IC 210-1. The signal received by the second group of signal lines GL2 in the time interval T2 is from the first IC 210-2. The second group of signal lines GL2 does not need to wait for the charging of the adjacent first group of signal lines GL1 to be completed to charge. Moreover, the signal received by the third group of signal lines GL3 is from the second IC 210-1. The signal received by the fourth group of signal lines GL4 is from the second IC 210-2. That is to say, the signals received by the third group of signal lines GL3 and GL4 are from different second ICs. This enables the supply timings of the time interval data signal groups SD1 and SD2 to be overlapped or even be completely the same, the supply timings of the scan signals SG1 and SG2 to be overlapped or even be completely the same, and the supply timings of the scan signals SG3 and SG4 to be overlapped or even be completely the same. Therefore, frame time lengths F(N) and F(N+1) of the present embodiment are respectively determined by half of the product of the time length a and the number of the second signal lines LR1 to LR6. That is, the frame time lengths F(N) and F(N+1) are equal to "(b×G)/2". The frame time lengths F(N) and F(N+1) of the electronic device 200 are substantially half of the frame time lengths of the conventional driving method.

Figure 5:
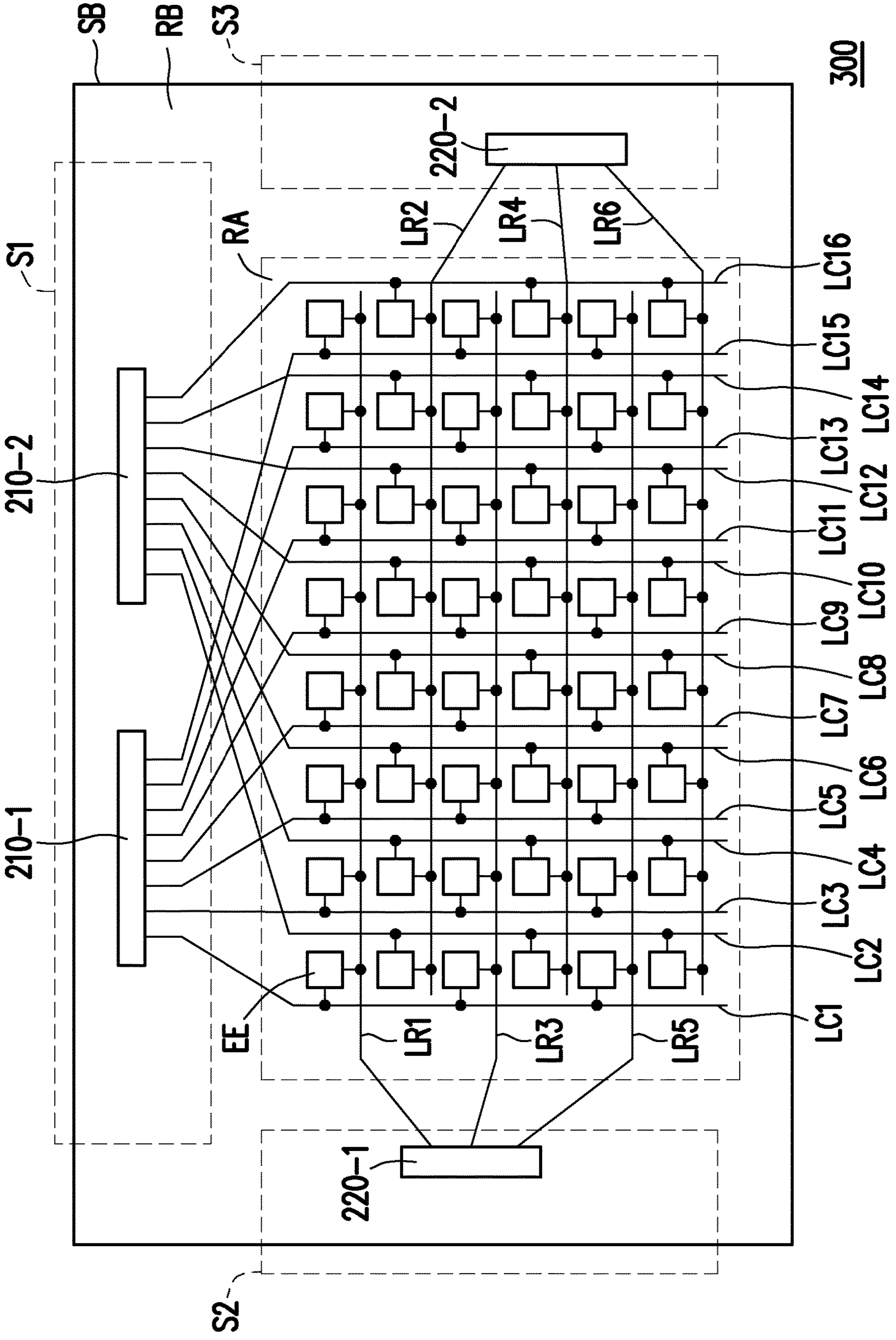
FIG. 5 is a schematic diagram of an electronic device shown according to the third embodiment of the disclosure.

Please refer to FIG. 5. FIG. 5 is a schematic diagram of an electronic device shown according to the third embodiment of the disclosure. In the present embodiment, an electronic device 300 includes the substrate SB, the plurality of modulating elements EE, the first signal lines LC1 to LC16, the second signal lines LR1 to LR6, the first ICs 210-1 and 210-2, and the second ICs 220-1 and 220-2. Different from the electronic device 200 shown in FIG. 3, the second IC 220-1 is disposed along the second side S2 of the substrate SB. The second IC 220-2 is disposed along a third side S3 of the substrate SB. The third side S3 is opposite to the second side S2.

Figure 6:
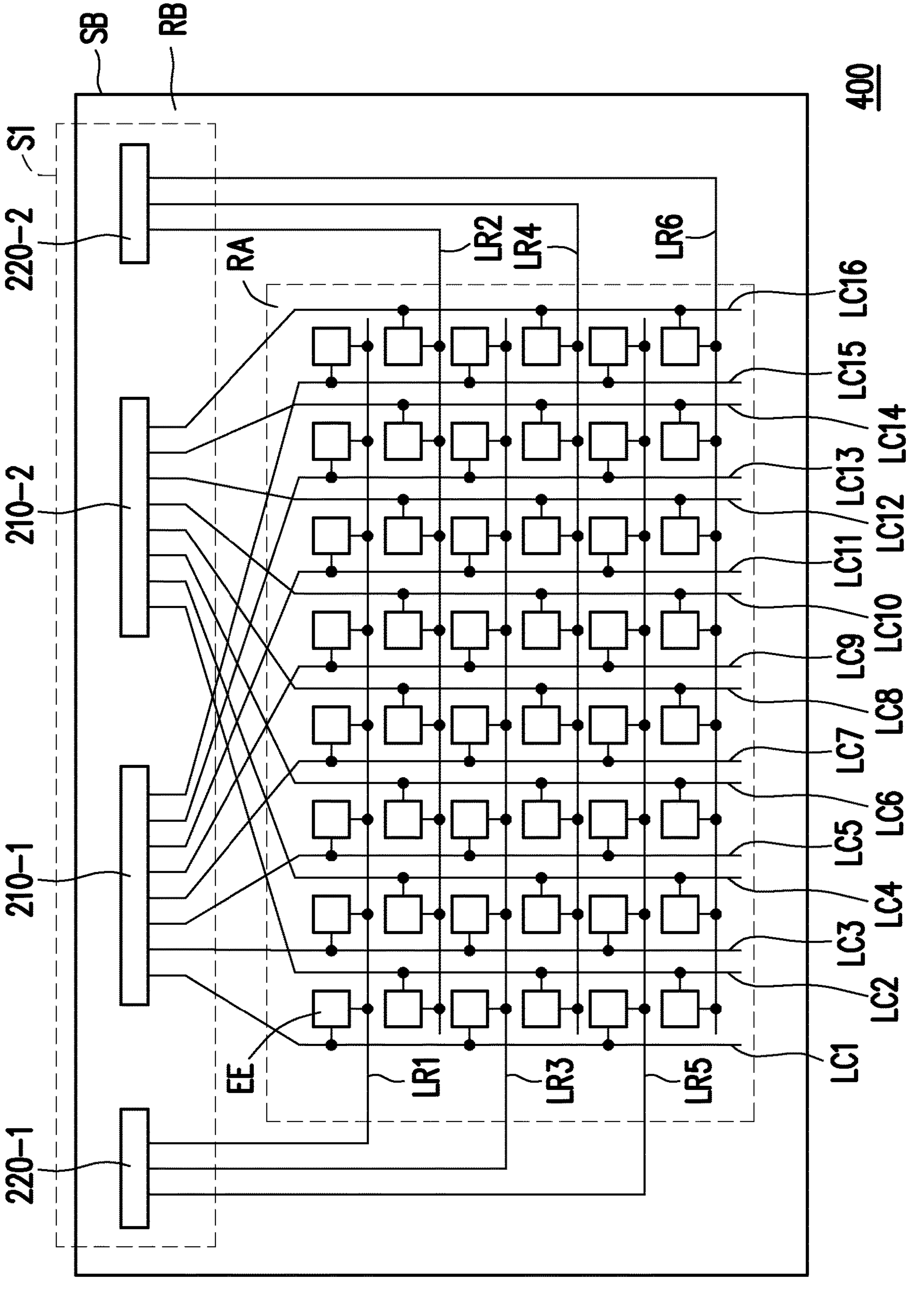
FIG. 6 is a schematic diagram of an electronic device shown according to the fourth embodiment of the disclosure.

Please refer to FIG. 6. FIG. 6 is a schematic diagram of an electronic device shown according to the fourth embodiment of the disclosure. In the present embodiment, an electronic device 400 includes the substrate SB, the plurality of modulating elements EE, the first signal lines LC1 to LC16, the second signal lines LR1 to LR6, the first ICs 210-1 and 210-2, and the second ICs 220-1 and 220-2. Different from the electronic device 300 shown in FIG. 5, the first ICs 210-1 and 210-2 and the second ICs 220-1 and 220-2 are disposed along the first side S1 of the substrate SB.

Figure 7:
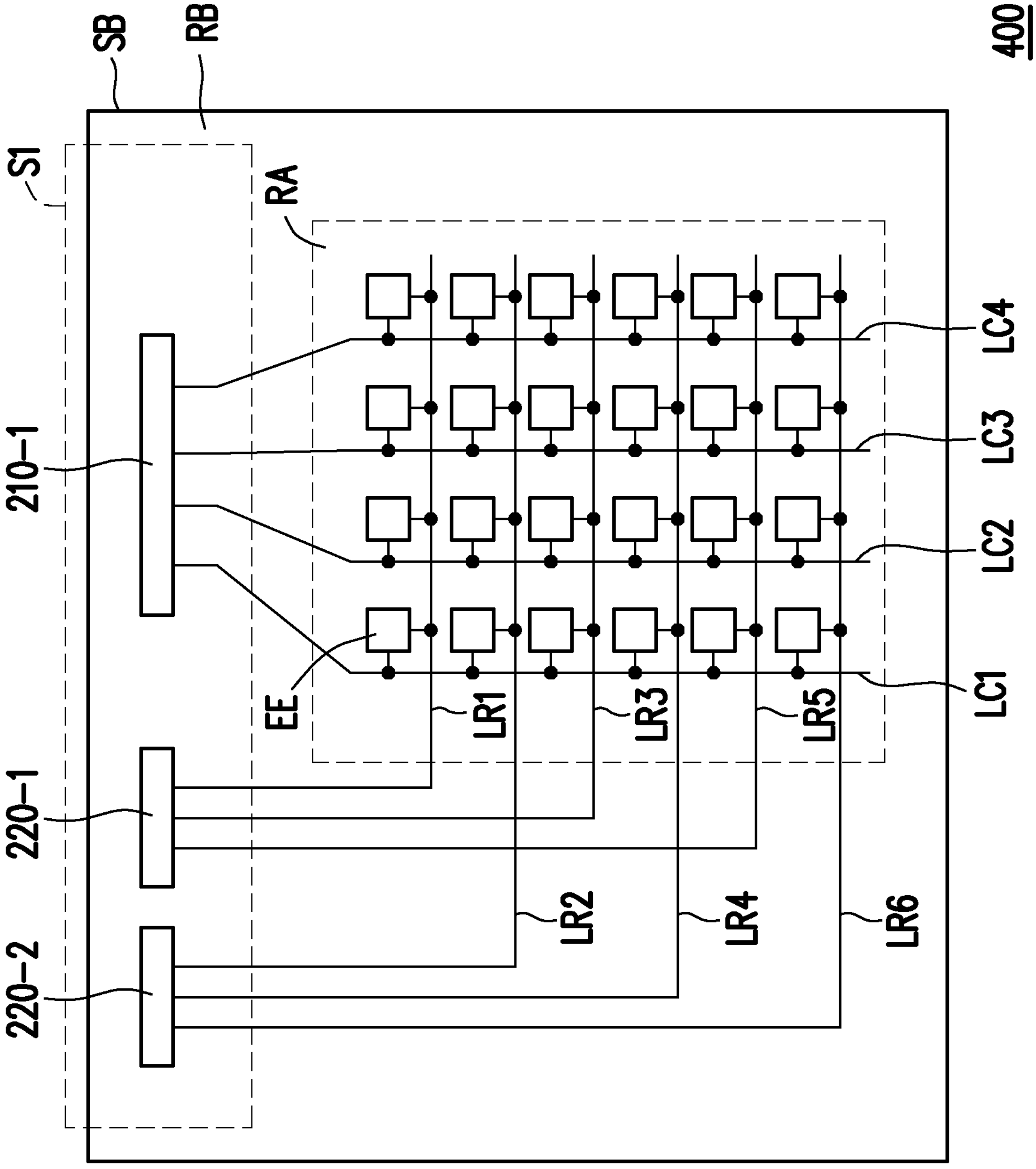
FIG. 7 is a schematic diagram of an electronic device shown according to the fifth embodiment of the disclosure.

Please refer to FIG. 7. FIG. 7 is a schematic diagram of an electronic device shown according to the fifth embodiment of the disclosure. In the present embodiment, an electronic device 500 includes the substrate SB, the plurality of modulating elements EE, the first signal lines LC1 to LC4, the second signal lines LR1 to LR6, the first IC 210-1, and the second ICs 220-1 and 220-2. The first IC 210-1 is electrically connected to the plurality of modulating elements EE via the first signal lines LC1 to LC4. The second IC 220-1 is electrically connected to the plurality of modulating elements EE via the second signal lines LR1, LR3, and LR5. The second IC 220-2 is electrically connected to the plurality of modulating elements EE via the second signal lines LR2, LR4, and LR6. The second signal lines LR1 to LR6 are disposed alternately in the active area RA. In the present embodiments, the first IC 210-1 and the second ICs 220-1 and 220-2 are disposed along the first side S1 of the substrate SB.

Figure 8:
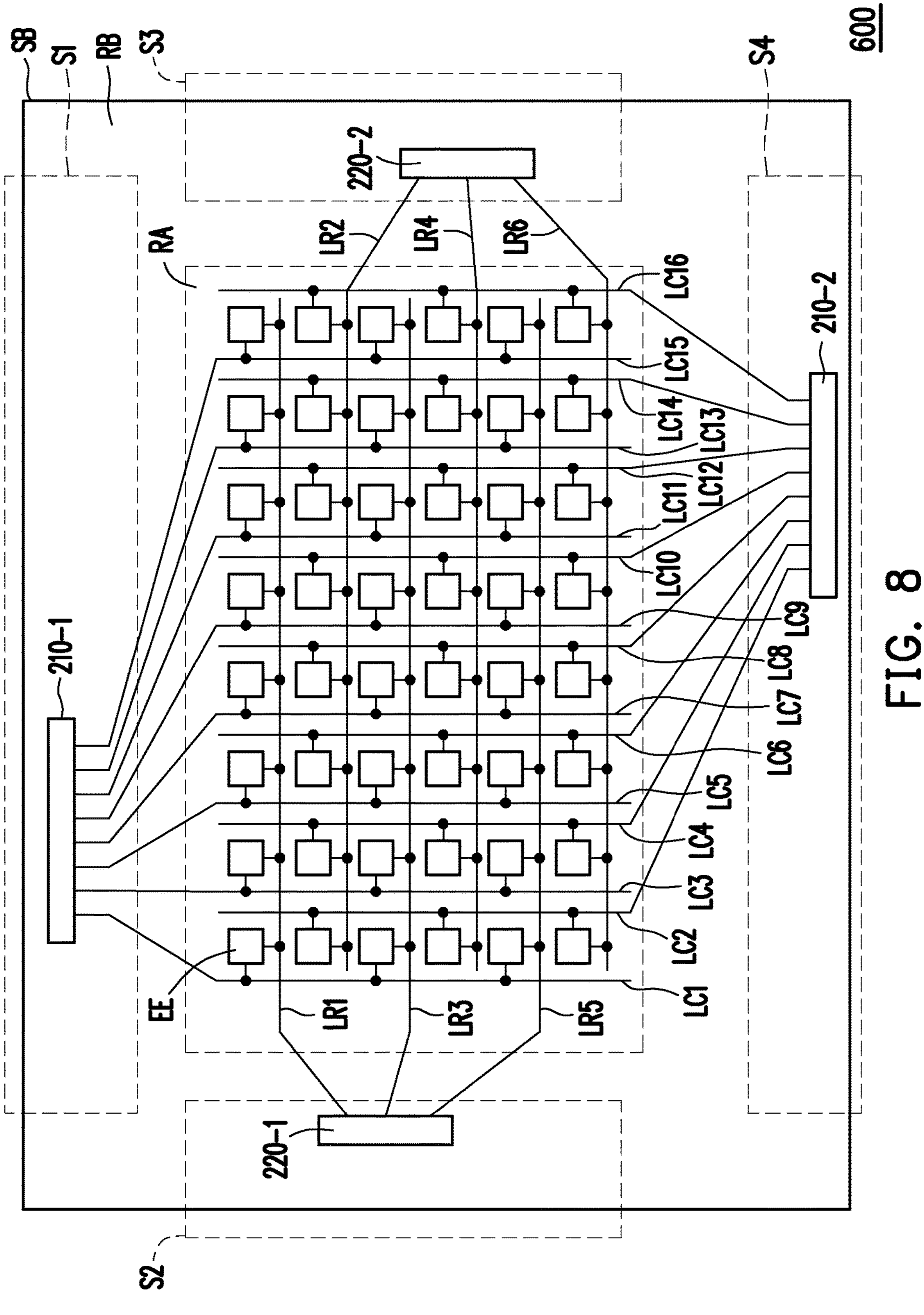
FIG. 8 is a schematic diagram of an electronic device shown according to the sixth embodiment of the disclosure.

Please refer to FIG. 8. FIG. 8 is a schematic diagram of an electronic device shown according to the sixth embodiment of the disclosure. An electronic device 600 includes the substrate SB, the plurality of modulating elements EE, the first signal lines LC1 to LC16, the second signal lines LR1 to LR6, the first ICs 210-1 and 210-2, and the second ICs 220-1 and 220-2. Different from the electronic device 200 shown in FIG. 3, the first IC 210-1 is disposed along the first side S1 of the substrate SB. The first ICs 210-1 and 210-2 and the second ICs 220-1 and 220-2 are respectively disposed along different sides of the substrate SB. In the present embodiment, the first IC 210-2 is disposed along a fourth side S4 of the substrate SB. The fourth side S4 is opposite to the first side S1. The second IC 220-1 is disposed along the second side S2 of the substrate SB. The second IC 220-2 is disposed along the third side S3 of the substrate SB. The third side S3 is opposite to the second side S2.

Figure 9:
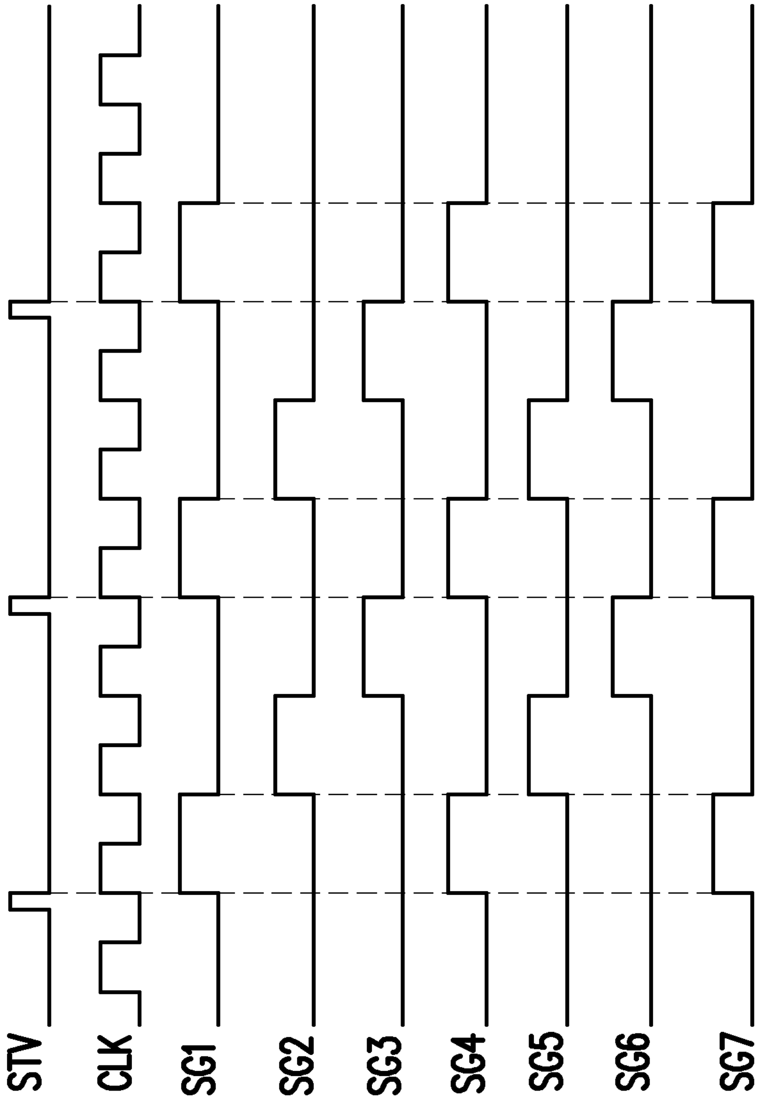
FIG. 9 is a signal timing diagram shown according to an embodiment of the disclosure.

Please refer to FIG. 9. FIG. 9 is a signal timing diagram shown according to an embodiment of the disclosure. FIG. 9 shows timings of scan signals SG1 to SG7. In the present embodiment, the plurality of timings of the plurality of corresponding signals provided by the plurality of second ICs are identical to each other. For example, the present embodiment is suitable for high bandwidth or special wave front applications. Based on a clock signal CLK, the timing of the scan signal SG1 is the same as the timing of the corresponding scan signal SG4 and the timing of the corresponding scan signal SG7. The timing of the scan signal SG2 is the same as the timing of the corresponding scan signal SG5. The timing of the scan signal SG3 is the same as the timing of the corresponding scan signal SG6. The timing of the present embodiment may be achieved by at least two second ICs of the first embodiment to the fourth embodiment. Further, the clock signal CLK is generated according to the trigger of a start signal STV. Therefore, in the first period of the clock signal CLK, the scan signals SG1, SG4, and SG7 are generated. In the second cycle of the clock signal CLK, the scan signals SG2 and SG5 are generated, and so on.

Figure 10:
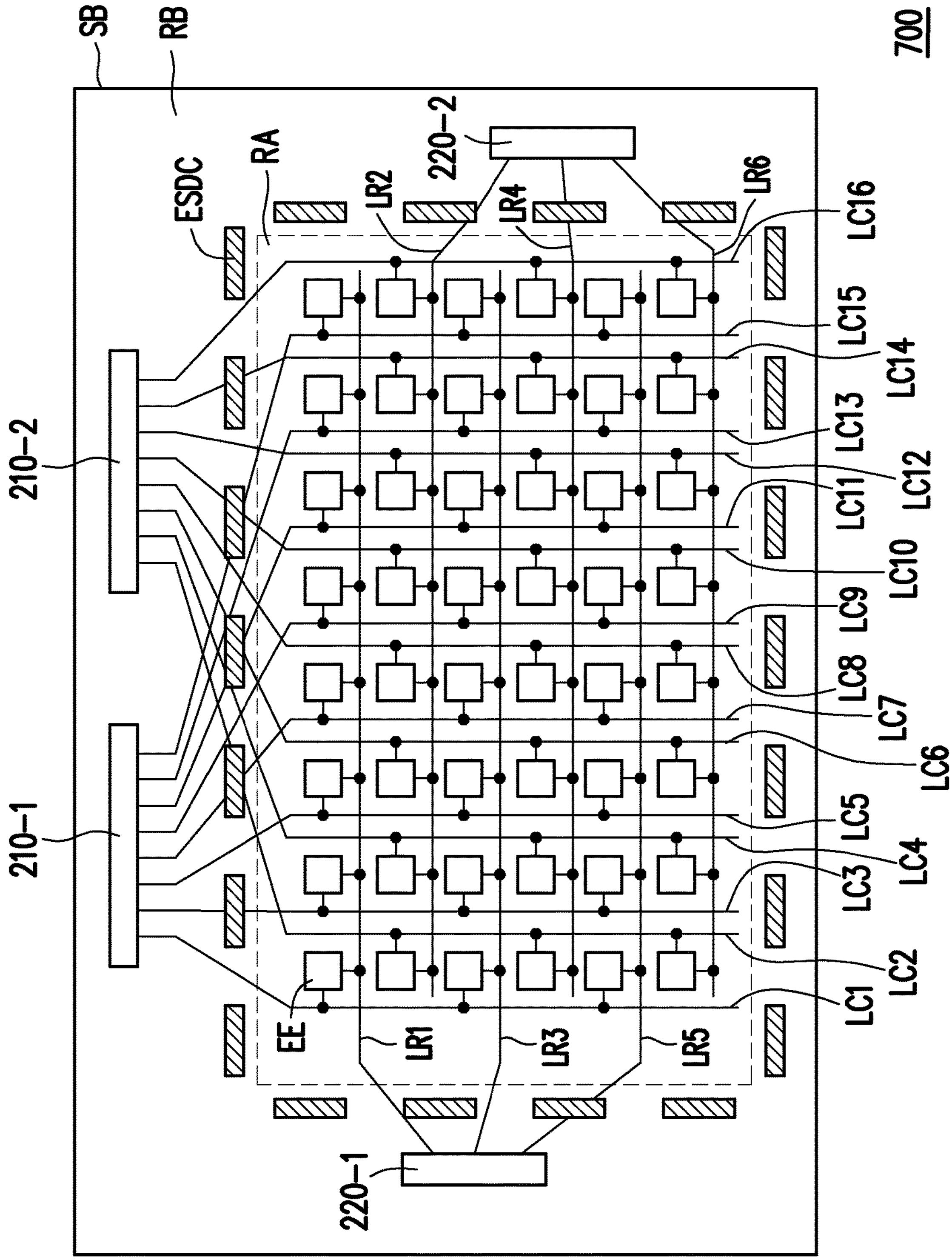
FIG. 10 is a signal timing diagram shown according to the seventh embodiment of the disclosure.

Please refer to FIG. 10. FIG. 10 is a signal timing diagram shown according to the seventh embodiment of the disclosure. In the present embodiment, an electronic device 700 includes the substrate SB, the plurality of modulating elements EE, the first signal lines LC1 to LC16, the second signal lines LR1 to LR6, the first ICs 210-1 and 210-2, the second ICs 220-1 and 220-2, and a plurality of electrostatic discharge (ESD) elements ESDC. The implementation of the substrate SB, the plurality of modulating elements EE, the first signal lines LC1 to LC16, the second signal lines LR1 to LR6, the first ICs 210-1 and 210-2, and the second ICs 220-1 and 220-2 is clearly described in the embodiments of FIG. 3 and FIG. 4, and is therefore not repeated herein. In the present embodiment, the plurality of ESD elements ESDC are disposed in the peripheral area RB and surround the active area RA. In the present embodiment, there is a distance between two adjacent ESD elements ESDC. That is, the plurality of ESD elements ESDC are not disposed consecutively.

In the present embodiment, the ESD elements ESDC may be connected to at least one of the plurality of modulating elements EE, the first signal lines LC1 to LC16, and the second signal lines LR1 to LR6. Therefore, the corresponding elements connected to the ESD elements ESDC may avoid damage caused by ESD during the manufacturing process or during use.

Figure 11:
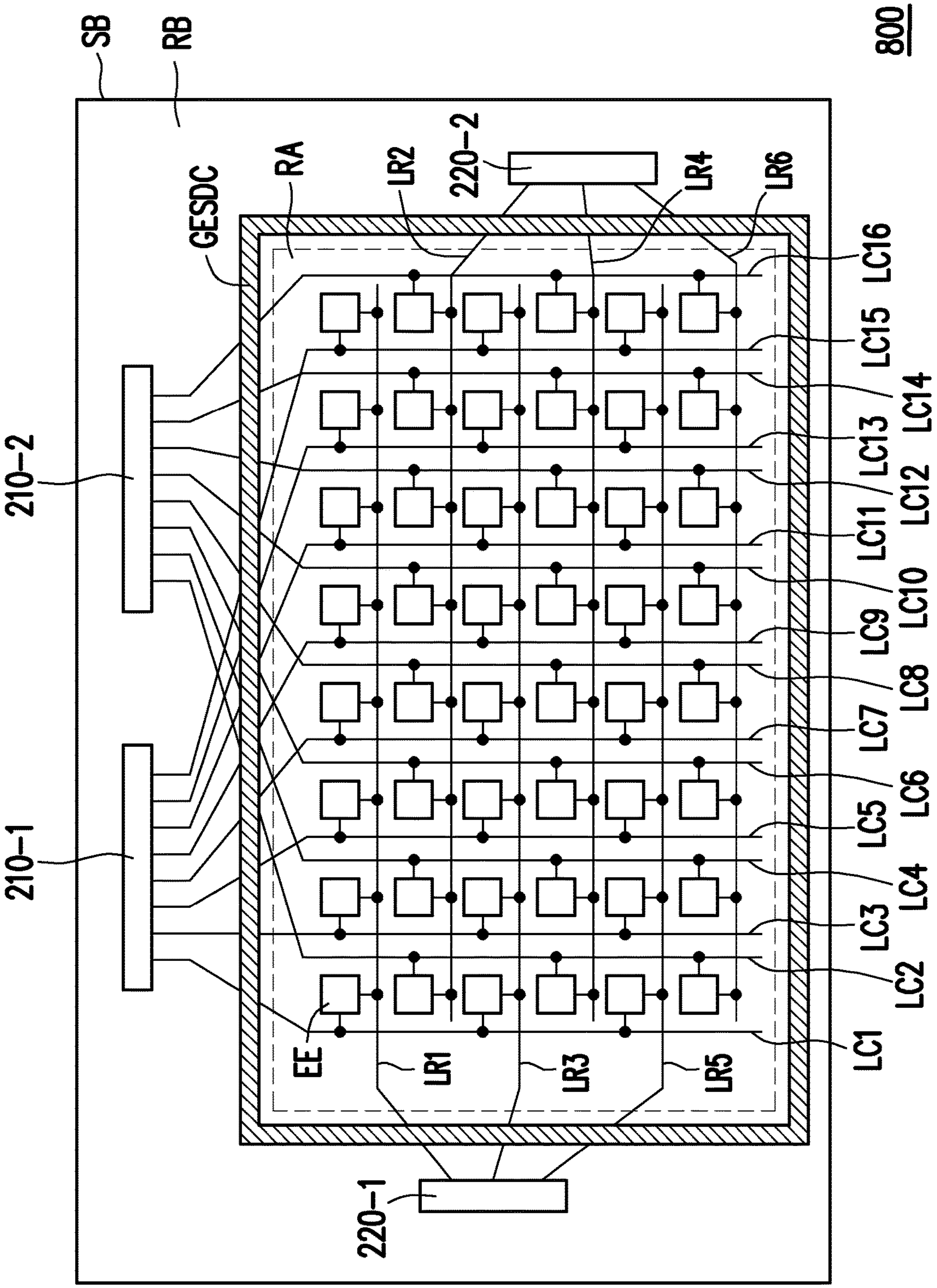
FIG. 11 is a schematic diagram of an electronic device shown according to the eighth embodiment of the disclosure.

Please refer to FIG. 11. FIG. 11 is a schematic diagram of an electronic device shown according to the eighth embodiment of the disclosure. In the present embodiment, an electronic device 800 includes the substrate SB, the plurality of modulating elements EE, the first signal lines LC1 to LC16, the second signal lines LR1 to LR6, the first ICs 210-1 and 210-2, the second ICs 220-1 and 220-2, and an ESD element group GESDC. The implementation of the substrate SB, the plurality of modulating elements EE, the first signal lines LC1 to LC16, the second signal lines LR1 to LR6, the first ICs 210-1 and 210-2, and the second ICs 220-1 and 220-2 is clearly described in the embodiments of FIG. 3 and FIG. 4, and is therefore not repeated herein. In the present embodiment, the ESD element group GESDC is disposed in the peripheral area RB and surrounds the active area RA. The ESD element group GESDC includes a plurality of ESD elements (such as the ESD elements ESDC shown in FIG. 10) disposed consecutively. In the present embodiment, there is no distance between two adjacent ESD elements.

Each of the first ICs is electrically connected to the first group of signal lines and the second group of signal lines. Moreover, the first group of signal lines and the second group of signal lines are disposed alternately in columns. The signals received by two adjacent signal lines come from different first ICs. Therefore, the charging of the first signal lines does not need to wait for the charging of the previous adjacent signal line to be completed. In this way, the frame time length of the electronic device may be shortened. In some embodiments, the second signal lines are divided into the third group of signal lines and the fourth group of signal lines. The third group of signal lines and the fourth group of signal lines are disposed alternately in rows. The second IC is electrically connected to the third group of signal lines. The second IC is electrically connected to the fourth group of signal lines. In this way, the frame time length of the electronic device may be further shortened. In addition, in some embodiments, the electronic device further includes ESD elements. Therefore, the corresponding elements connected to the ESD elements may avoid damage caused by ESD during the manufacturing process or during use.

Lastly, it should be mentioned that: each of the above embodiments is used to describe the technical solutions of the disclosure and is not intended to limit the disclosure; and although the disclosure is described in detail via each of the above embodiments, those having ordinary skill in the art should understand that: modifications may still be made to the technical solutions recited in each of the above embodiments, or portions or all of the technical features thereof may be replaced to achieve the same or similar results; the modifications or replacements do not make the nature of corresponding technical solutions depart from the scope of the technical solutions of each of the embodiments of the disclosure.

What is claimed is:

1. An electronic device, comprising:

a substrate;

a plurality of first signal lines disposed on the substrate and divided into a first group of signal lines and a second group of signal lines, wherein the plurality of first signal lines are respectively extending along a first direction;

a plurality of second signal lines disposed on the substrate, wherein the plurality of second signal lines are respectively extending along a second direction and the first direction is perpendicular to the second direction;

two first integrated circuits bonded on the substrate and each electrically connected to respective one of the first group of signal lines and the second group of signal lines, wherein the first group of signal lines and the second group of signal lines are disposed alternately in columns, wherein one of the first integrated circuits provides a first data signal group to the first group of signal lines for a first time length; and a second integrated circuit bonded on the substrate and electrically connected to the plurality of second signal lines, wherein the second integrated circuit provides a scan signal to one of the plurality of second signal lines for a second time length, wherein the second time length is shorter than the first time length, and wherein one of the first integrated circuits provides the first data signal group to the first group of signal lines during a first time interval, the other of the first integrated circuits provides second data signal group to the second group of signal lines during a second time interval, and the first time interval overlaps at least partially with the second time interval.

2. The electronic device of claim 1, wherein:

the plurality of first signal lines are one of data lines and scan lines, and the plurality of second signal lines are the other one of the data lines and the scan lines.

3. The electronic device of claim 1, wherein the two first integrated circuits are one of a gate driving integrated circuit and a data driving integrated circuit.

4. The electronic device of claim 3, wherein the gate driving integrated circuit comprises a level shifter circuit, a shift register circuit, and a timing shifter circuit.

5. The electronic device of claim 1, further comprising:

another second integrated circuit bonded on the substrate, wherein the plurality of second signal lines are divided into a third group of signal lines and a fourth group of signal lines, wherein the second integrated circuit and the another second integrated circuit are each electrically connected to respective one of the third group of signal lines and the fourth group of signal lines, and wherein the third group of signal lines and the fourth group of signal lines are disposed alternately in rows.

6. The electronic device of claim 5, wherein:

the two first integrated circuits are disposed along a first side of the substrate, and the two second integrated circuits are disposed along at least one side of the substrate different from the first side.

7. The electronic device of claim 5, wherein the two first integrated circuits and the two second integrated circuits are disposed along a first side of the substrate.

8. The electronic device of claim 5, wherein the two first integrated circuits and the two second integrated circuits are respectively disposed along four different sides of the substrate.

9. The electronic device of claim 5, wherein a plurality of timings of a plurality of corresponding signals provided by the two second integrated circuits are identical to each other.

10. The electronic device of claim 5, wherein:

the substrate comprises an active area and a peripheral area, the two first integrated circuits and the two second integrated circuits are respectively disposed at the peripheral area, and the electronic device further comprises a plurality of electrostatic discharge elements disposed in the peripheral area and surrounding the active area.

11. A modulating device, comprising:

a substrate;

a modulating element;

a plurality of first signal lines disposed on the substrate and divided into a first group of signal lines and a second group of signal lines, wherein one of the plurality of first signal lines is electrically connected to the modulating element, wherein the plurality of first signal lines are respectively extending along a first direction;

a plurality of second signal lines disposed on the substrate, wherein the plurality of second signal lines are respectively extending along a second direction and the first direction is perpendicular to the second direction, wherein one of the plurality of second signal lines is electrically connected to the modulating element;

two first integrated circuits bonded on the substrate and each electrically connected to respective one of the first group of signal lines and the second group of signal lines, wherein the first group of signal lines and the second group of signal lines are disposed alternately in columns, wherein one of the first integrated circuits provides a first data signal group to the first group of signal lines for a first time length; and a second integrated circuit bonded on the substrate and electrically connected to the plurality of second signal lines, wherein the second integrated circuit provides a scan signal to one of the plurality of second signal lines for a second time length;

wherein the second time length is shorter than the first time length, and wherein one of the first integrated circuits provides the first data signal group to the first group of signal lines during a first time interval, the other of the first integrated circuits provides second data signal group to the second group of signal lines during a second time interval, and the first time interval overlaps at least partially with the second time interval.

12. The modulating device of claim 11, wherein the modulating element is a varactor.

13. The modulating device of claim 11, wherein:

the plurality of first signal lines are one of data lines and scan lines, and the plurality of second signal lines are the other one of the data lines and the scan lines.

14. The modulating device of claim 11, wherein the two first integrated circuits are one of gate driving integrated circuits and a data driving integrated circuit.

15. The modulation device of claim 14, wherein the gate driving integrated circuit comprises a level shifter circuit, a shift register circuit, and a timing shifter circuit.

16. The modulating device of claim 11, further comprising:

another second integrated circuit bonded on the substrate, wherein the plurality of second signal lines are divided into a third group of signal lines and a fourth group of signal lines, wherein the second integrated circuit and the another second integrated circuit are each electrically connected to respective one of the third group of signal lines and the fourth group of signal lines, and wherein the third group of signal lines and the fourth group of signal lines are disposed alternately in rows.

17. The modulating device of claim 16, wherein:

the two first integrated circuits are disposed along a first side of the substrate, and the two second integrated circuits are disposed along at least one side of the substrate different from the first side.

18. The modulating device of claim 16, wherein the two first integrated circuits and the two second integrated circuits are disposed along a first side of the substrate.

19. The modulating device of claim 16, wherein the two first integrated circuits and the two second integrated circuits are respectively disposed along four different sides of the substrate.

20. The modulating device of claim 16, wherein:

the substrate comprises an active area and a peripheral area, the two first integrated circuits and the two second integrated circuits are respectively disposed at the peripheral area, and the electronic device further comprises a plurality of electrostatic discharge elements disposed in the peripheral area and surrounding the active area.

* * * * *